Jan. 23, 1934.  A. C. LINDGREN ET AL  1,944,750
WINDROW HARVESTER
Filed Nov. 22, 1930   3 Sheets-Sheet 2
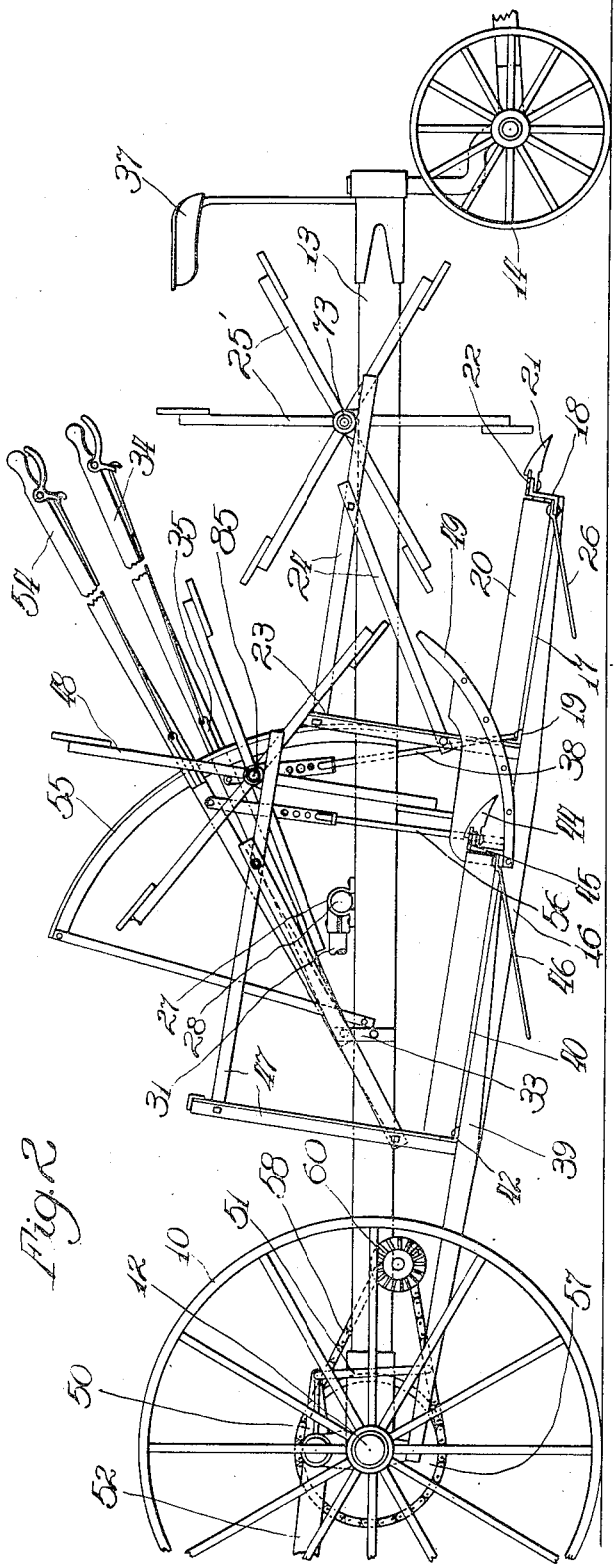
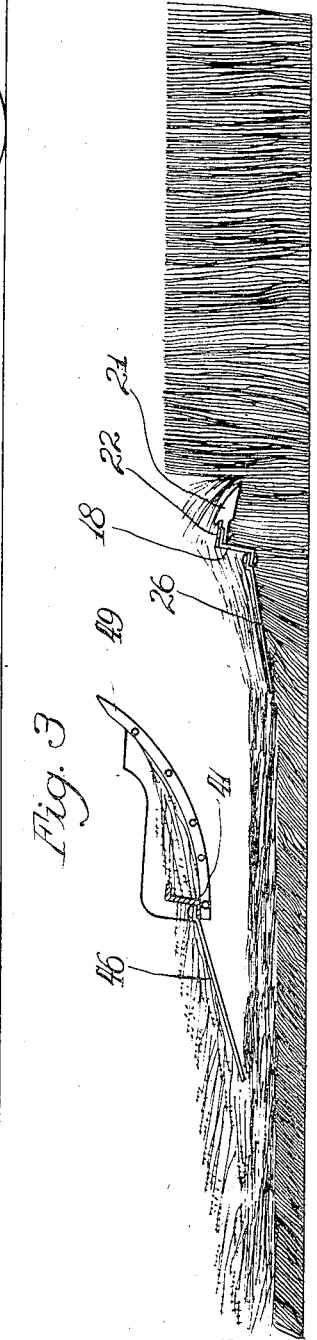

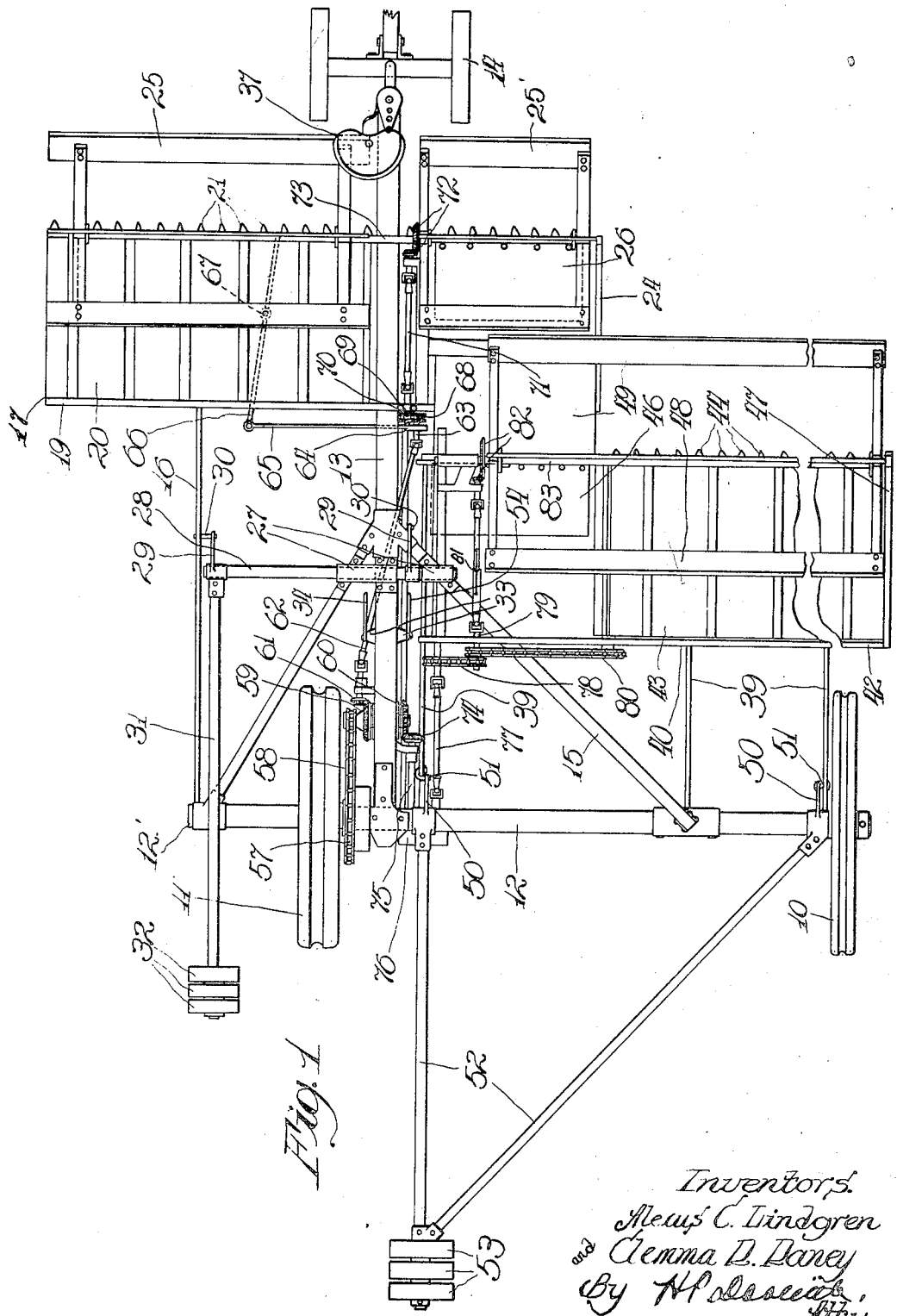

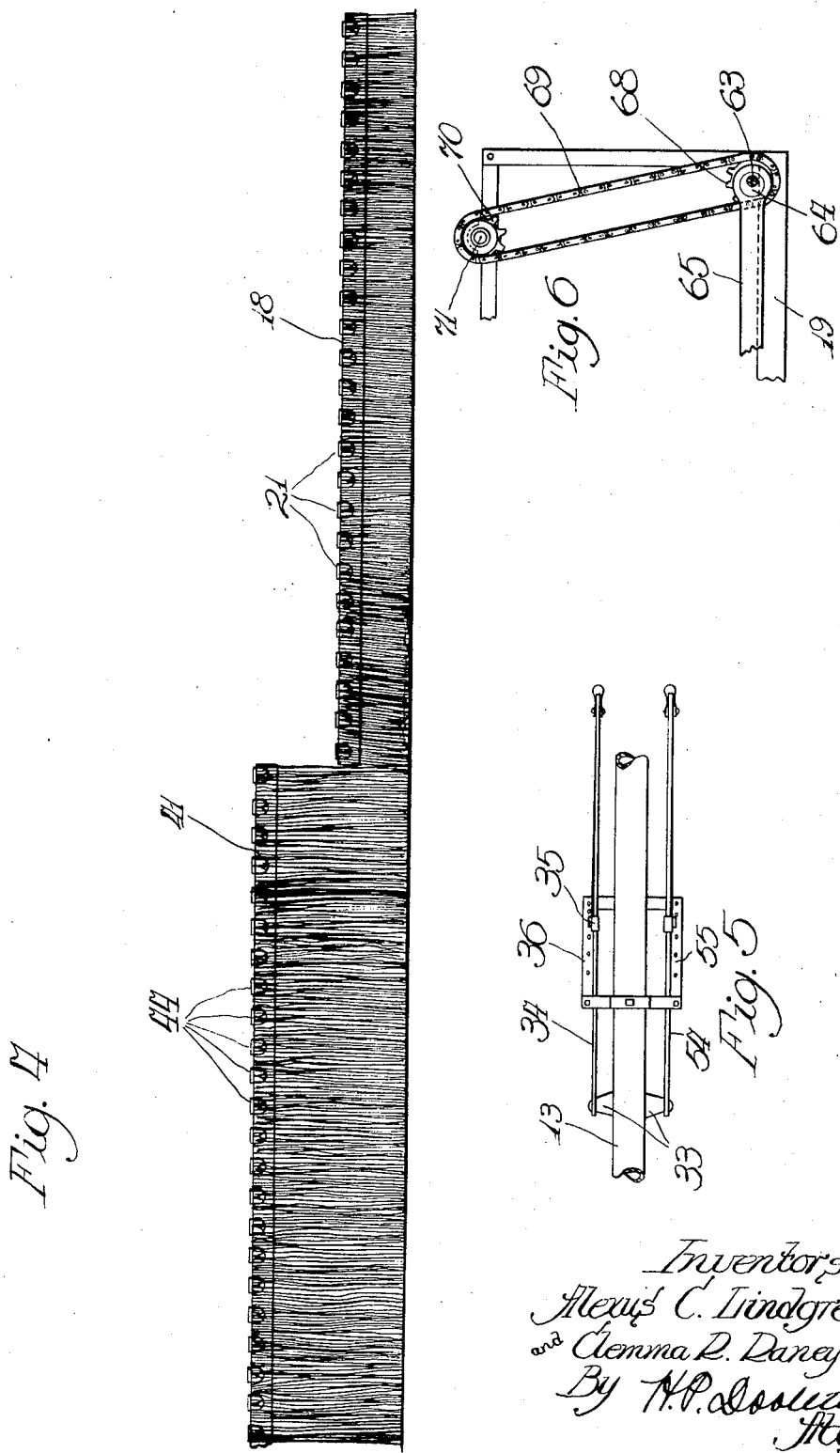

UNITED STATES PATENT OFFICE 1,944,750

WINDROW HARVESTER

Alexus C. Lindgren, Chicago, and Clemma R. Raney, Riverside, Ill., assignors to International Harvester Company, a corporation of New Jersey Application November 22, 1930
Serial No. 497,412

21 Claims. (Cl. 56—23)

The invention is in a windrow harvester.

These machines in effect are header type harvesters which head standing grain and include means to convey the same laterally of the line of travel to a point of discharge where, in some types of machines, means is provided to bend over the tops only of field stubble whereby to form an elevated mat or stubble cushion, upon which the discharging headed grain is laid in a windrow capable of aeration throughout from all sides and including the bottom thereof.

Such types of windrowers have proven very satisfactory in practice, because the grain will be evenly cured and any weeds present will be thoroughly dried, to the end that better threshing will result after the windrow has been picked up and fed into the thresher. Incidentally, as such windrow is supported above and clear of the ground, it can additionally be more readily and thoroughly picked up preparatory to such threshing.

By the windrow harvester of this invention, it is proposed to provide a unitary structure embodying two headers or windrowers operating in the manner above described and in which a forward windrower is adjusted to a low level to cut only a straw portion of a swath headed by a previous round of the machine. This straw portion is then conveyed laterally in a grainward direction to be deposited upon a prepared cushion stubble support. This results in a primary layer of straw portions lying on the elevated field stubble support well above the ground, to permit ventilation therebeneath. The other windrower is offset rearwardly and grainwardly and is moving through standing grain to head the same, and these cut head portions are moved by the conveyer laterally in a stubbleward direction and are then laid on top of the primary straw portion layer formed as described.

By this structure an improved windrow results, which is better supported in an elevated position above the ground, and which windrow can also be more expeditiously picked up.

The main object of the invention, therefore, is to provide a machine which will cut and form a windrow of a straw portion or layer deposited upon an elevated prepared stubble mat, and also to cut a head portion of the grain which is then laid as a second layer or windrow on top of the first layer of straw portions.

A further object is to provide means for pressing down the tops of field stubble along a width predetermined to the width of a windrow to be laid, to form an elevated cushion support or mat on which the straw portion is laid, after which the head portions are laid on the straw portion to form an improved window.

Another object is to provide a double windrower, as stated, comprising a unitary structure adapted to be drawn through a field to perform the functions above recited.

Another object is to provide convenient means for adjusting the two windrow headers independently of each other, to regulate their heights of cut.

Other objects will become apparent to those skilled in this art as the disclosure is more fully made.

In the accompanying sheets of drawings, a practicable embodiment of the invention has been illustrated by way of example, and in these drawings:

Figure 1 is a general plan view of the improved windrower;

Figure 2 is a general side elevational view thereof;

Figure 3 is a schematic side view of the windrow forming parts;

Figure 4 is a front elevational view, showing how the two cutter bars are disposed relatively to each other;

Figure 5 is a top plan view of the adjusting levers for independently raising and lowering the two harvester platforms; and, Figure 6 is a rear elevational view of a detail of the driving mechanism.

The machine is carried on a pair of rear wheels 10 and 11, said wheels serving to journal and support a transverse axle 12 which protrudes at 12' a distance laterally of the wheel 11 in a stubbleward direction. Connected to this axle 12 is a forwardly and longitudinally disposed main frame member 13, the forward end of which is supported on a steering tongue truck 14, said frame 13 being suitably braced by the two oppositely and obliquely extending supplementary frame members 15, which suitably connect with the axle structure 12.

At the stubbleward side of the longitudinal frame 13, the axle part 12' carries supporting structure represented by the longitudinally and forwardly extending line bar 16 for supporting a header platform 17 including at its front end the usual form of transverse Z-bar 18, and at its rear end the usual parallel transverse angle bar 19. This header platform 17 carries an endless apron conveyer 20, while the Z-bar 18 thereof carries in the usual manner finger guards 21, with which is associated a conventional form of reciprocating sickle 22.

As shown in Figure 2, the platform 17 includes the usual uprights 23 carrying supporting structure 24 for mounting a reel 25, which cooperates with the cutting mechanism 22 to lay the straw portion gathered by this havester part onto the conveyer 20. The conveyer 20 is driven to move the gathered straw portions transversely in a grainward direction, which will be toward the longitudinal frame pipe 13 and therebeneath, said straw portion then discharging onto an off end plate 26, which is carried by the Z-bar 18 and inclined downwardly to the rear with respect thereto. It is to be noted that the cutting mechanism 21—22 is extended laterally in a grainward direction of the discharge end of the conveyer 20, so that the plate 26 preferably will be disposed directly behind a length of said cutting mechanism. A section of reel 25' is arranged in any appropriate manner to cooperate with the structure just described.

Carried on the frame structures 13 and 15 are journals 27 which mount for rocking movement a transversely disposed shaft 28, which carries at its stubbleward end a fast crank arm 29 having a connection 30 with the line bar 16. Connected with the crank arm 29 is a rearwardly extending arm 31 carrying at its rear end counterweights 32, which serve to counter-balance the weight of the platform 17, to make adjustment thereof easy.

The frame 13, as best shown in Figure 5, carries a support 33, to which is pivoted a long forwardly extending lever 34 having detent mechanism 35 associated with an arcuate rack 36 appropriately carried on the frame pipe 13. This lever 34 is accessible to the operator's station 37 for manipulation and has connected thereto a rod 38, said rod 38 in any appropriate manner having its lower end connected to raise and lower the platform 17.

At the grainward side of the longitudinal frame pipe 13 the axle 12 carries forwardly projecting line levers 39, which at their forward ends carry a second havester platform 40 delineated at its forward end by a Z-bar 41 and at its rear end by a parallel, transversely disposed angle bar 42. It is to be observed that the platform 40 is rearwardly offset relatively to the platform 17. This platform 40 carries in the conventional manner a conveyer 43, which is driven to move in a stubbleward direction, that is, in the direction of the frame 13. The Z-bar 41 carries finger guards 44 and a reciprocatory sickle 45, which cutting mechanism is projected a distance stubblewardly of the discharge end of the conveyer 43, to provide a space for location of a downwardly inclined plate 46 connected to the Z-bar 41. Suitable frame structure 47 is carried by the platform 40 to mount a reel 48. Also carried by the Z-bar 41, is a forwardly and upwardly curved compressor or deflector shield 49.

It is to be noted that the plate 26, deflector 49, and plate 46 are all in longitudinal alignment and operate over the path along which the windrow is to be laid.

The axle 12 carries rockable cranks 50 having means 51 engaging underneath certain of the line bars 39, said rockable crank arms 50 being connected with rearwardly converging arms 52, which carry weights 53 to counter-balance the weight of the platform 40 and the structure carried thereby, to facilitate easy adjustment of this platform. As shown in Figure 5, another lever 54 is associated with an arcuate rack 55 to adjust the platform 40 up or down by the rod 56 suitably connected between the lever 54 and an appropriate part of the platform 40. The driving mechanism for the movable parts will next be described.

The grain wheel 11 is connected in any appropriate manner with a sprocket wheel 57 to drive a chain 58, which in turn is geared to drive a gear 59 and a gear 60. The gear 59 drives a bevel gear 61, which drives flexible shafting 62, which leads to a shaft 63 (see also Figure 6), said shaft carrying an eccentric 64 to reciprocate a pitman 65, which oscillates a bar 66 pivoted at 67 underneath the platform 17, whereby to reciprocate the sickle 22. Said shaft 63 will also be appropriately arranged to drive a roller not shown that drives the conveyer 20 in the usual manner. The shaft 63 furthermore carries a sprocket wheel 68 connected by a chain 69 to a sprocket wheel 70, which drives a shaft 71 connected by gearing 72 to drive a reel shaft 73 for operating the reel 25, 25'.

The gear 60 drives a bevel gear 74 to drive a shaft 75, which operates gearing, not shown, within a case 76, out of which case 76 extends a longitudinally and forwardly protruded shaft 77, which is driven to operate a chain 78, which is connected to drive a shaft 79. The shaft 79 also drives a chain 80 through suitable sprocket wheels to drive the apron conveyer 43. Further, this shaft 79 drives an upwardly and forwardly inclined expansible shaft 81 connected by gearing 82 to drive the reel shaft 83 for turning the reel 48. Any suitable form of clutch mechanism, not shown, will be provided to disconnect these drives described from the ground wheel 11, so that the machine can be transported to hold the driven parts stationary when not harvesting.

In use, a field will be opened up and both platforms 17 and 40 will be set by the levers 34 and 54 to an elevated position where they will both cut their respective swaths at the same height in a heading operation. The headed grain thus cut will be received by the two conveyers 20 and 43 and will be moved to the respective plates 26 and 46. The front plate 26, as shown in Figure 3, is constantly operative on the field stubble left behind the sickle 22 to bend the tops thereof forwardly to prepare an elevated stubble mat or cushion on which the headed grain is gently laid in a windrow. The deflector 49 acts to guide this advance portion of the windrow below the rearwardly disposed Z-bar 41, and the rear plate 46 is further operative to flatten somewhat the advance portion of the windrow, so that the rear portion of the windrow coming from the conveyer 43 can be laid thereon. After the first round, the machine will overlap its previous course, so that the platform 17 will, after it has been lowered as shown in Figure 4, cut a straw portion only, which will be conveyed laterally in a grainward direction to the plate 26 and laid thereby on a prepared elevated stubble mat. At the same time, the platform 40, which has been adjusted to header height, is moving through a swath of standing grain and heading the same, the headed crop being moved to the plate 46 down which the same is gently slid onto the elevated straw portion, which is being laid in advance thereof.

By this apparatus, then, a new form of windrow can be laid, in which the stubble tops are formed into an elevated supporting mat to receive a layer of cut straw only and then, on top of this layer of straw, headed grain is laid, so that it will best dry out evenly.

From this detailed description, it must now be apparent that an improved machine is provided, which achieves the desirable objects heretofore recited.

It is the intention to cover herein all such changes and departures from the example disclosed which do not depart from the spirit and scope of the invention which has been expressed in the following claims.

What is claimed is:

1. In a windrow harvester, means for severing standing grain into a separate straw portion and a separate head portion and leaving a standing field stubble portion, means for laying the separate straw portion in a windrow on the field stubble portion, and means for laying the separate head portion in a windrow on the aforementioned windrow.

2. In a windrow harvester, a main frame, said frame carrying a first harvester part for cutting a swath and discharging its cut in a windrow, and said frame also carrying a second laterally offset harvester part for cutting a second swath and discharging its cut in a windrow onto the first formed windrow.

3. In a unitary windrow harvester, a frame, said frame carrying a first harvester part for cutting a swath and discharging its cut in a windrow, and said frame also carrying a second harvester, part for cutting a second swath and discharging its cut in a windrow onto the first formed windrow, said harvester parts being arranged laterally of each other in offset relationship.

4. In a windrow harvester, a frame, said frame carrying a first harvester part for cutting a swath and discharging its cut in a windrow, said frame also carrying a second harvester part for cutting a second swath and discharging its cut in a windrow onto the first formed windrow, and means on the frame for independently adjusting said harvester parts to vary their height of cut.

5. In a windrow harvester, a first harvester part for cutting a swath and discharging its cut in a windrow, a second offset harvester part for cutting a second swath and discharging its cut in a windrow onto the first formed windrow, means for independently adjusting the height of cut of said harvester parts, independent counter-balancing means for each of said harvesters, and a single frame carrying said harvester parts.

6. In a windrow harvester, a main frame carrying a pair of windrowing units disposed in lateral offset relationship, and means included in each unit for depositing the cuts to form a single window.

7. A unitary harvester structure comprising a main frame carrying a pair of windrowing units disposed in lateral offset relationship.

8. A unitary harvester structure comprising a frame carrying a pair of windrowing units disposed in lateral offset relationship, and means for independently adjusting the height of cut of each unit.

9. In a windrow harvester, a first harvester part having means for cutting a swath and conveying the cut crop to a point of discharge, means included in the first part for bending the tops of field stubble to form an elevated stubble mat, said bending means also acting to discharge the crop on said mat in a windrow supported clear of the ground, a second harvester part laterally offset relative to the first harvester part and having means for cutting a swath and conveying its cut to a point of discharge, and means at said point of discharge for depositing the second cut on top of the windrow laid by the first harvester part.

10. In a windrow harvester, a first harvester part having means for cutting a swath and conveying the cut crop to a point of discharge, a plate included in the first part for bending the tops of field stubble to form an elevated stubble mat, said plate also acting gently to lay the discharging crop on said mat in a windrow supported clear of the ground, a second harvester part laterally offset relative to the first harvester part and having means for cutting a swath and conveying its cut crop to a point of discharge, and means at said point of discharge for depositing the second cut on top of the windrow laid by the first harvester part.

11. In a windrow harvester, a first harvester part having means for cutting a swath and conveying the cut crop to a point of discharge, means included in the first part for bending the tops of field stubble to form an elevated stubble mat, said bending means also acting gently to lay the discharging crop on said mat in a windrow, a second harvester part laterally offset relative to the first harvester part and having means for cutting a swath and conveying and discharging its cut on top of the windrow laid by the first harvester part.

12. In a windrow harvester, a first harvester part having means for cutting a straw portion and conveying the same to a point of discharge, means included in the first part for bending the tops of field stubble to form an elevated stubble mat, said bending means also acting gently to lay the straw portion on said mat in a windrow, a second harvester part offset rearwardly and laterally relative to the first harvester part and having means for cutting a head portion and conveying the same to a point of discharge, and means at said point of discharge for depositing the head portions on top of the straw portion laid by the first harvester part.

13. In a windrow harvester, a first harvester part having means for cutting a swath and conveying the cut crop to a point of discharge, means included in the first part for bending the tops of field stubble to form an elevated stubble mat, said bending means also acting gently to lay the discharging crop on said mat in a windrow, a second harvester part offset laterally relative to the first harvester part and having means for cutting a swath and conveying its cut crop to a point of discharge, means at said latter point of discharge for depositing the second cut on top of the windrow laid by the first harvester part, and means for independently adjusting said two harvester parts to regulate their heights of cut.

14. In a windrow harvester, a first harvester part having means for cutting a swath and conveying the cut crop to a point of discharge, means included in the first part for bending the tops of field stubble to form an elevated stubble mat, said bending means also acting gently to lay the discharging crop on said mat in a windrow, a second harvester part offset laterally and rearwardly relative to the first harvester part and having means for cutting a swath and conveying and discharging its cut crop on top of the windrow laid by the first harvester part, and means for independently adjusting said two harvester parts to regulate their heights of cut.

15. A unitary harvester structure comprising a first windrowing unit, a second windrowing unit offset rearwardly and laterally of the first unit, each of said units having longitudinally aligned crop discharging means for laying the cut crop along the same path in a double layer windrow, and a main frame carrying both of said units.

16. A unitary harvester structure comprising a first windrowing unit, a second windrowing unit offset rearwardly and laterally of the first unit, each of said units having longitudinally aligned crop discharging means for laying the cut crop along the same path in a double layer windrow, means for setting said units to cut at different heights, and a main frame carrying both of said units.

17. A windrow harvester comprising a frame carrying a pair of offset transverse windrowing units, each unit having a transversely moving conveyer, discharging means at the inner ends of said units, and means to move the conveyers in opposite directions.

18. A windrow harvester comprising a frame carrying a pair of offset transverse windrowing units, each unit having a transversely moving conveyer, discharging means for said units arranged to lay the cut crop in the same windrow, and means to move the conveyers in opposite directions.

19. A windrow harvester comprising a frame carrying a pair of offset transverse windrowing units, each unit having a transversely moving conveyer, means to move one conveyer grainwardly, means to move the other conveyer stubblewardly, and longitudinally aligned discharging means to lay the crop from the units in a single windrow.

20. A windrow harvester comprising a transverse wheel carried axle, a longitudinal frame member carried by the axle, a wheel truck carrying the front end of said member, a pair of transversely disposed, offset windrower units carried by and disposed in advance of the axle, a conveyer on each unit, means to move the conveyers oppositely toward said frame member, and means on each unit to discharge the cut crop from each unit into a single windrow.

21. A windrow harvester comprising a transverse wheel carried axle, a longitudinal frame member carried by the axle, a wheel truck carrying the front end of said member, a pair of transversely disposed, offset windrower units carried by and disposed in advance of the axle, a conveyer on each unit, means to move the conveyers oppositely toward said frame member, and longitudinally aligned crop discharging means for each unit respectively disposed at the inner end of its unit to lay a single windrow that will be straddled by the wheels carrying the axle.

ALEXUS C. LINDGREN.
CLEMMA R. RANEY.